H. W. MILLAR.
Agricultural Boiler.
No. 102,028. 
Patented April 19, 1870.
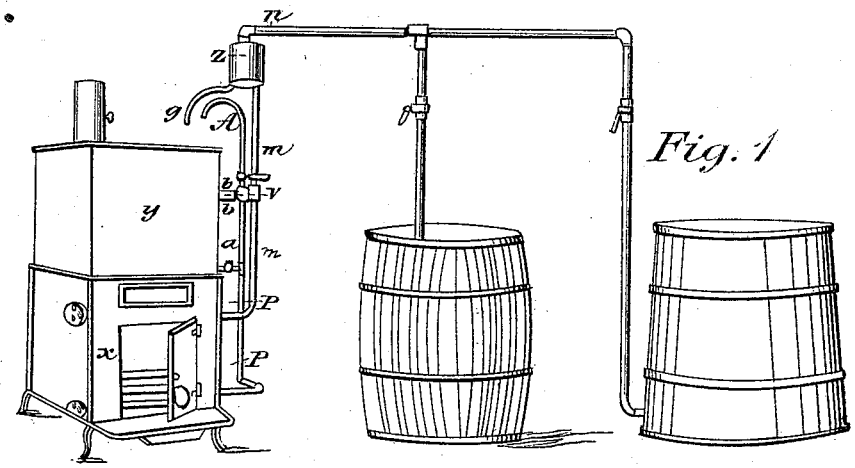
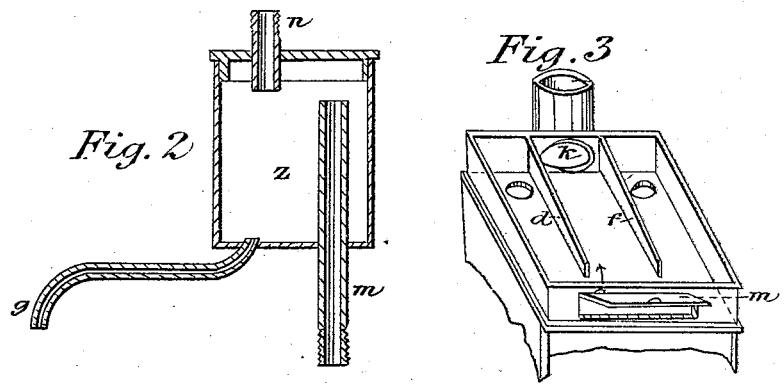
Witnesses:
Inventor:

United States Patent Office.

HENRY W. MILLAR, OF UTICA, NEW YORK.

Letters Patent No. 102,028, dated April 19, 1870.

---

AGRICULTURAL STEAMER.

---

The Schedule referred to in these Letters Patent and making part of the same.

---

*To all whom it may concern:*

Be it known that I, HENRY W. MILLAR, of the city of Utica, in the county of Oneida and State of New York, have invented a new and improved Agricultural Steamer.

Nature and Objects of my Invention.

My invention relates to the combination of any circulating heater and a tank to feed it, and a stop-cock and a check-valve, in such a manner that when the stop-cock is open the water circulates freely through the heater and between the heater and tank, and is thus heated, and in such a manner that, when the stop-cock is closed by the aid of the check-valve, all return of water from the heater directly to the tank is prevented, and the water in the heater not being able to pass into the tank will remain at rest until sufficiently heated to be partially converted into steam, and then the force of the steam generated will drive this mixture of steam and water up into the pipes leading into receptacles for cooking the fodder or other substance, the heater being constantly fed with water from the tank by the aid of the check-valve; the object of this part of my invention being to obtain a cheap, durable, and useful apparatus for converting water into steam for cooking fodder or other substances, and to accomplish the same by a very small consumption of fuel.

The second part of my invention relates to the use of a separating-chamber in combination with any circulating-heater in such a manner that when the steam generated in the heater shall drive the mixed water and steam up into the separating-chamber, the water shall be separated from the steam, and the water thus separated may be returned to again feed the heater, while the steam may be again carried to any desired point; the object of this part of my invention being to more perfectly adapt a circulating heater to the purposes of boiling or steaming fodder or other substances, and that said fodder or other substance to be boiled or steamed by said steam shall be more thoroughly and expeditiously boiled or steamed because of the absence of water in the process of steaming or boiling.

Description of the Accompanying Drawings.

Figure 1 is a side view of my agricultural steamer, exhibiting tank and heater, separating-chamber and pipes, stop-cocks and check-valve, and receptacle for the fodder or other substances to be boiled or steamed.

Figure 2 is a vertical sectional view through the center of my separating-chamber.

Figure 3 is a top view of the smoke-flue underneath the hot-water tank or pan.

General Description.

X is the heater.

Y, the tank.

P is the pipe that conducts the water from the tank Y into the heater X.

$a$ is a check-valve in the pipe P, permitting the water to flow from the tank through the pipe P into the heater, but not to return through said pipe.

$m$ is a pipe connected to the upper part of the circulating heater, and connected with a pipe, $n$, either with or without the interposition of a separating-chamber.

$n$ is a pipe leading into the receptacles for the fodder or other substances to be steamed.

V is a pipe connecting the tank Y with pipe $m$.

$b$ is a stop-cock placed in the pipe V.

When a separating-chamber is used, Z is the separating-chamber. The pipe $m$ will then pass up a considerable distance into the interior of said chamber (see fig. 2).

The pipe $n$ will be connected to the top of Z.

G is a tube connected at its upper end to the bottom of Z, and having its other end curved over the tank Y.

A is a pipe connected at its lower end with P, and having its upper end curved over tank Y.

In the smoke-flue, (see fig. 3,) R and S are holes for the escape of the smoke of the fire in the heater below into the flue.

$d$ and $f$ are upright division plates, separating the holes R and S from the hole in the chimney.

K is the hole in the chimney.

Mode of Operation.

I will first describe the mode and operation of my agricultural steamer and boiler when used without a separating-chamber.

The mode of operation is as follows:

The tank Y is filled with water; the stop-cock $b$ is opened; the water from the tank is then passed out into the pipe P, and fills the heater X. A fire is then started in the heater; the water will then circulate freely through the heater and between the heater and tank.

When the water is heated quite hot, and is on the point of being converted into steam, the stop-cock $b$ is closed. All return of water from the heater to the tank is thus prevented, and the same water will remain in the pipe $m$ and in the heater X until sufficiently heated to be partially converted into steam; a very little fire at this stage of heating will suffice. The force of the steam then generated will drive up a mixture of steam and water, (but principally steam,) into the pipe $n$, and will then pass into the fodder or other substances to be boiled, and the mixture of water and steam is continually applied until the fodder or other substance is properly steamed or boiled.

During this entire operation the heater X is continually fed from the tank Y by the pipe P.

When a separating-chamber is used, this chamber Z is affixed onto the pipe m, so that a portion of this pipe projects upward into the interior of the chamber, and the pipe n is properly attached to the top of the chamber.

The mode of operation of the separating-chamber is then as follows:

When the mixed steam and water is driven up the pipe m, to be sent to the receptacles for fodder, it enters the separating-chamber Z. The water separating from the steam falls to the bottom of this chamber and there finds an outlet through the pipe O, by which it is conveyed back into the tank for future use, while the steam in the separating-chamber being freed from its water, passes up through the pipe n, by which it is conveyed to the receptacles for boiling or steaming fodder or the other substances.

The heat of the fire and heated air and gas, after being used to heat the heater, are carried underneath the bottom of the tank by means of a return-flue, (see fig. 3,) and thus the heat is utilized and economized.

The smoke, flame, and heated gases pass up from the heater through the holes R and S into the flue, and by the upright division-plates D and F they are compelled to pass under the sides of the bottom of the tank and then around the ends of the side plates, and then back under the center of the tank before passing out of the chimney K.

A pipe, A, is connected to the feed-pipe P of the heater and carried to a sufficient height to enable its upper and open end to curve over the top of the tank and thus all danger from explosion, in case all outlets from the heater should be closed, is prevented.

The heater hereinbefore described can be applied to any purpose where it is desired to use steam at a low pressure.

Claims.

1. The combination of a circulating heater and a tank to feed it, and stop-cock and check-valve, substantially as described and for the purposes hereinbefore mentioned.

2. The use of a separating-chamber Z, in combination with any circulating heater, substantially as described, and for the purposes hereinbefore mentioned.

HENRY W. MILLAR.

Witnesses:
ABNER GARDNER,
JOHN J. DONNELLY.